No. 722,500. PATENTED MAR. 10, 1903.
J. S. DOWNARD & B. A. ROLOSON.
APPARATUS FOR TREATING ROCK ASPHALT.
APPLICATION FILED AUG. 5, 1901.
NO MODEL. 2 SHEETS—SHEET 1.
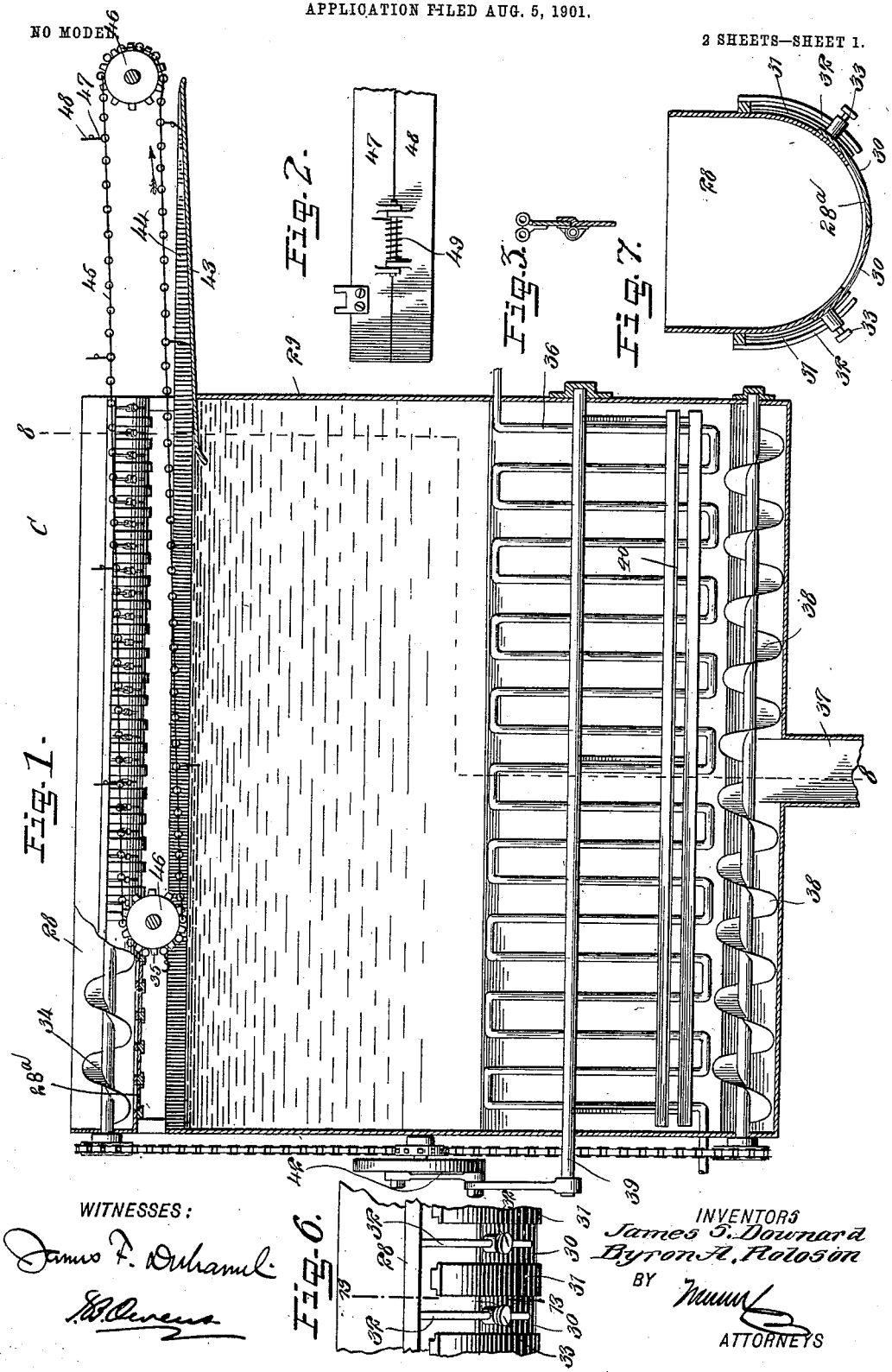
WITNESSES: INVENTORS
James S. Downard
Byron A. Roloson
BY
ATTORNEYS No. 722,500. PATENTED MAR. 10, 1903.
J. S. DOWNARD & B. A. ROLOSON.
APPARATUS FOR TREATING ROCK ASPHALT.
APPLICATION FILED AUG. 5, 1901.
NO MODEL. 2 SHEETS—SHEET 2.
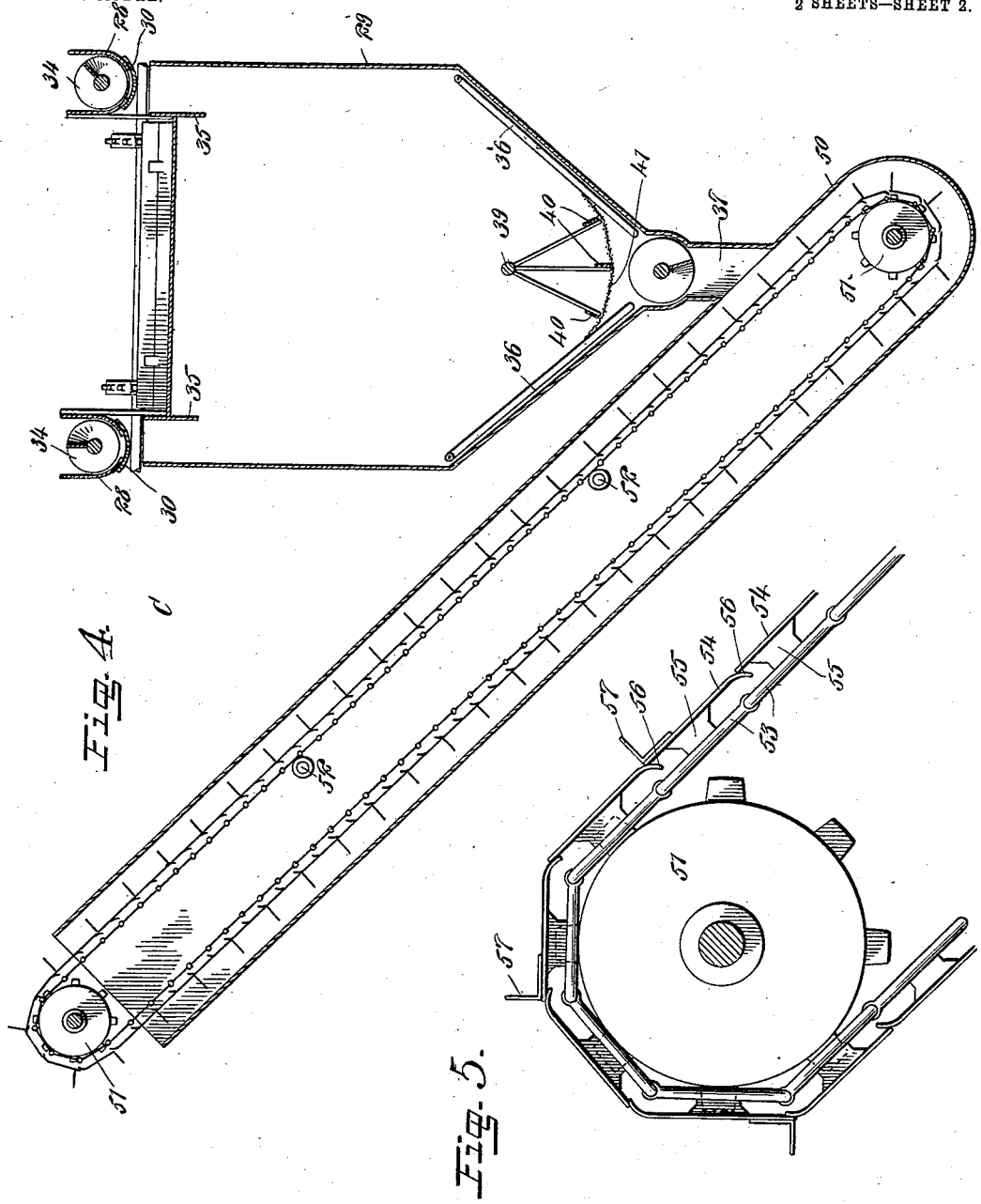
WITNESSES:
James F. Duhamel
J. B. Owens
INVENTORS
James S. Downard
Byron A. Roloson
BY
ATTORNEYS

UNITED STATES PATENT OFFICE.

JAMES S. DOWNARD AND BYRON A. ROLOSON, OF LIMA, OHIO.

APPARATUS FOR TREATING ROCK-ASPHALT.

SPECIFICATION forming part of Letters Patent No. 722,500, dated March 10, 1903.

Application filed August 5, 1901. Serial No. 70,893. (No model.)

*To all whom it may concern:*

Be it known that we, JAMES S. DOWNARD and BYRON A. ROLOSON, citizens of the United States, and residents of Lima, in the county of Allen and State of Ohio, have invented a new and Improved Apparatus for Treating Rock-Asphalt, of which the following is a full, clear, and exact description.

This invention relates generally to means for extracting asphalt from the natural rock bearing it; and it relates specifically to certain novel means for separating the asphalt from the crushed rock.

Reference is to be had to the accompanying drawings, forming a part of this specification, in which similar characters of reference indicate corresponding parts in all the views.

Figure 1 is a sectional view of the separator. Figs. 2 and 3 are detail views of the skimming device. Fig. 4 is a section on the line 8 8 of Fig. 1. Fig. 5 is an enlarged view showing the conveyer for the sand and other pulverized material from which the asphalt is separated. Fig. 6 is a fragmentary elevation showing the means for regulating the feed of the crushed rock to the separator, and Fig. 7 is a section on the line 13 13 of Fig. 6.

The rock-asphalt should first be crushed and delivered to the separator forming the subject-matter of this patent. The streams of crushed rock passing from the crusher (not shown) fall into the left-hand ends of the troughs 28. (See Figs. 1 and 4.) These troughs extend parallel with each other at opposite sides of the separator-tank 29. The troughs 28 extend throughout the length of the tank 29 and are provided with perforated bottoms 28ª, (see Figs. 1 and 7,) covered by curved slide-plates 30, held adjustably in guides 31, fastened to the trough outside thereof. By adjusting these slide-plates 30 the openings in the bottom of the trough may be regulated in size and a larger or smaller flow of crushed material provided for, as desired. 32 indicates rods which are fastened rigidly to the troughs 28 and curving in conformity with the curvature thereof. These rods serve to hold the slide-plates 30 in the desired adjustment through the medium of clamping devices 33, attached to the slide-plates. Within each trough 28 is arranged a worm 34. These worms are suitably driven and serve to advance the material continuously along the troughs, thus insuring an even flow therefrom. At the inner side of each trough a vertical division-plate 35 is arranged, these plates extending longitudinally of the troughs and serving to form narrow spaces between themselves and the side walls of the separator-tank, through which spaces the crude material falls without interference with the stratum of asphalt which is separated within the tank 29 and rises to the top of the water therein. It will thus be seen that the asphalt as it is separated from the rock is not confused with the crude rock which is being continually delivered into the separator, these two materials being kept completely apart. The separator-tank 29 is intended to be kept filled with water to the level indicated in Fig. 1, and this water is kept at temperature by steam-pipes 36 or other means, as desired. The hot water in the tank 29 separates the asphalt from the sand and other material, and this solid material falls upon the sloping bottom of the tank, where it is delivered therefrom through a spout 37.

38 indicates a screw or worm in two sections oppositely disposed, this worm lying in the bottom of the tank 29 and serving by its rotation steadily to conduct the sand to the spout 37.

39 indicates a rock-shaft which is mounted in the lower portion of the tank 29 and extends longitudinally thereof. This rock-shaft carries agitators 40, which extend downward therefrom and work over the face of a concave curved screen 41. The rock-shaft 39 is driven by means of a gearing 42, (see Fig. 1,) which may be of any sort desired. Owing to the rocking movement of the shaft 39, the water at the lower part of the tank is agitated continuously, without, however, agitating the water in the upper part of the tank. The advantage of this is that the pulverized material which settles on the screen 41 is kept continuously agitated, and thus very thoroughly subjected to the action of the heated water in the tank. All asphalt in this material will therefore be separated and will rise to the surface, while the sand will be sifted through the screen into the narrow space at the bottom of the tank, in which space is located the screw 38.

In the top of the tank 29, at the end opposite the receiving end, is located an apron 43, which inclines slightly upward from the tank and projects beyond the same. (See Fig. 1.) The inner end of the apron is curved downward, as shown. This apron is provided with side flanges 44, which have their upper edges coincident with the upper edges of the side walls of the tank. The outer end of the apron is approximately at the same level as the upper edges of the tank. This apron is located between the division-plates 35 and is adapted to carry off the asphalt which rises from the surface of the water in the tank.

45 indicates an endless conveyer-chain which runs over sprockets 46 and is suitably driven in the direction of the arrow in Fig. 1. This chain carries, to move transversely, scrapers, which are formed of relatively stationary sections 47, fastened to the conveyer-chain, and swinging sections 48, hinged to the sections 47 and provided with springs 49, which tend to throw the sections 48 outward in the plane of the sections 47. As the chain 45 moves over the upper part of the tank the scrapers on the bottom run of the chain are engaged in the asphalt at the top of the tank, and the asphalt is carried onward with the scrapers toward the apron 43. As the scrapers move farther the sections 48 swing on the sections 47, thus bearing firmly yet yieldingly on the apron 43. They carry the asphalt with them along the apron and discharge it from the outer end thereof. It is pointed out that the conveyer 45 stands at an inclination to the horizontal and that the asphalt is moved upward onto the apron. As the asphalt is removed from the end of the tank adjacent to the apron 43 the asphalt in the other end will naturally flow into this space, and thus the continual skimming of the asphalt will go on automatically, notwithstanding that the scrapers do not reach every part of the tank.

The earthy pulverized material which falls through the spout 37 is delivered into a conveyer-boot 50. (Best shown in Fig. 4.) This boot passes off transversely from the separator and upward therefrom. It carries an endless conveyer, which serves to take off the waste material and deposit it at a suitable dump at one side of the apparatus. This conveyer runs over sprocket-wheels 51 and has its upper or carrying run sustained on rollers 52, which prevent the sagging of the conveyer. The structure of the conveyer is best shown in Fig. 5, and it comprises links 53, connected together and carrying each a carrier-plate 54, through the medium of brackets or like devices 55, which are joined to the links and to the carrier-plates. These carrier-plates each have one end turned inward toward the links, as indicated at 56, such ends lying under the adjacent end of the contiguous carrier-plate, so that as the carrier turns around one of the sprockets 51 the curved or lip-like ends 56 ride against the adjacent plates and maintain a snug connection therewith.

57 indicates flights or flanges which are fastened to certain of the carrier-plates 54 to hold the material thereon, so as to form an angle where the carrier-plates move relatively to each other in passing over the sprocket-wheel 51, thereby breaking the charge of wet sand at such an angle as to cause it to discharge by gravity.

Various changes in the form, proportions, and minor details of our invention may be resorted to without departing from the spirit and scope of the same. Hence we consider ourselves entitled to all such variations as may lie within the scope of our claims.

Having thus described our invention, we claim as new and desire to secure by Letters Patent—

1. An apparatus for treating rock-asphalt, comprising a separator having a tank, a feed-trough with orifices therein, means for feeding material to the trough, and slide-plates adjustably mounted on the feed-trough to control the orifices thereof.

2. An apparatus for treating rock-asphalt, comprising a separator having a tank, an apron projecting out approximately horizontally from the top thereof, a conveyer moving over the top of the tank and apron, and scrapers carried by the conveyer and moving therewith over the tank and apron to skim the asphalt from the tank over the apron, said scrapers being formed of relatively stationary sections fastened to the conveyer and yieldingly mounted on the stationary sections.

3. An apparatus for treating rock-asphalt, comprising a separator having a tank, a feed-trough with orifices therein, and slide-plates adjustably mounted on the feed-trough to cover or uncover the orifices thereof.

4. An apparatus for treating rock-asphalt, comprising a separator having a tank, a feed-trough extending over one side of the tank, and a division-plate lying at the inner side of said feed-trough and extending vertically into the upper part of the tank, for the purpose specified.

5. An apparatus for treating rock-asphalt, comprising a separator having a tank, a division-plate extending vertically therein, means for feeding material into the tank at one side of the division-plate, and a horizontally-moving skimmer at the other side of the division-plate for skimming off the upper part of the contents of the tank.

6. An apparatus for treating rock-asphalt, comprising a separator having a tank, a division-plate extending vertically therein, a feed-trough extending longitudinally of the tank at one side of the division-plate, and a horizontally-moving skimming device at the other side of the division-plate, for the purpose specified.

7. An apparatus for treating rock-asphalt, comprising a separator having a tank, a feed-trough with orifices therein, guides on the feed-trough, slide-plates fitted in the guides to cover or uncover the orifices, rods attached to the trough, with which rods the said plates have sliding connection, and means for fastening the plates on the rods.

8. The combination of a trough, an apron extending off therefrom, a scraper or skimming device, and means for carrying said scraper or skimming device to move through the upper portion of the trough and over said apron, for the purpose specified, the said scraper or skimming device comprising two hingedly-connected plates and a spring-bearing between the same.

9. The combination of a tank, an apron extending from the tank outward beyond the same, said apron inclining slightly upward from the horizontal, an endless chain, means for carrying the same, and a scraper or skimming device carried on the chain and adapted to run through the upper portion of the tank and over the apron, the said scraper or skimming device comprising two hingedly-connected plates and a spring-bearing between the same.

10. The combination of a tank having a discharge-orifice at its bottom, a screen placed in the lower portion of the tank, an agitator mounted to work over the screen, and a conveying-screw placed in the bottom of the tank and serving to carry the sand into the discharge-orifice.

11. The combination of a tank having a discharge-orifice at its bottom, a screen placed in the lower portion of the tank, an agitator mounted to work over the screen, a conveying-screw placed in the bottom of the tank and serving to carry the sand into the discharge-orifice, and a heating device lying in the lower portion of the tank.

12. In an apparatus for treating rock-asphalt, the combination of a tank, a vertically-disposed division-plate in the upper portion thereof, means for feeding the asphalt into the tank at one side of the plate, means for skimming off the contents of the tank at the other side of the plate, a heating device in the lower portion of the tank, a screen in the lower portion of the tank, and an agitator working over the screen, said tank having an outlet at its bottom, for the sand.

13. In an apparatus for treating rock-asphalt, the combination of a tank having a discharge-orifice at its bottom, a screen placed in the lower portion of the tank, an agitator mounted to work over the screen, and a conveyer placed in the bottom of the tank and serving to carry the sand into the discharge-orifice.

14. In an apparatus for treating rock-asphalt, the combination of a tank, a heating means in the bottom portion thereof, a conveyer mounted to move approximately horizontally over the top of the tank, a scraper carried by the conveyer and adapted to carry off the asphalt floating in the tank, and an apron mounted on the upper end of the tank in a plane parallel to that of the conveyer and extending outward from the tank, the said scraper engaging and running along the top of the apron to draw the asphalt thereover.

In testimony whereof we have signed our names to this specification in the presence of two subscribing witnesses.

JAMES S. DOWNARD.
BYRON A. ROLOSON.

Witnesses:
L. N. INMEN,
C. S. MAUPIN.